US 8,205,260 B2

(12) United States Patent
Obrecht et al.

(10) Patent No.: US 8,205,260 B2
(45) Date of Patent: Jun. 19, 2012

(54) DETECTION OF WINDOW REPLACEMENT BY A MALICIOUS SOFTWARE PROGRAM

(75) Inventors: Mark Eric Obrecht, Austin, TX (US); Vijay Bharti, Bangalore (IN); Barrett Baxter, Austin, TX (US)

(73) Assignee: Symantec Operating Corporation, Mountain View, CA (US)

( * ) Notice: Subject to any disclaimer, the term of this patent is extended or adjusted under 35 U.S.C. 154(b) by 1216 days.

(21) Appl. No.: 11/960,251

(22) Filed: Dec. 19, 2007

(65) Prior Publication Data

US 2009/0165136 A1 Jun. 25, 2009

(51) Int. Cl.
*G06F 11/00* (2006.01)

(52) U.S. Cl. ........... 726/23; 726/22; 726/24; 726/25; 726/26; 705/51; 705/52; 705/53; 705/54; 717/174; 717/175; 717/176; 717/177; 717/178; 713/189; 713/190; 713/191; 713/192; 713/193; 713/194; 715/794; 715/795; 715/796; 715/797

(58) Field of Classification Search ............. 726/22–26; 705/51–54; 717/174–178; 713/189–194; 715/794–797

See application file for complete search history.

(56) References Cited

U.S. PATENT DOCUMENTS

| 7,380,277 | B2 | 5/2008 | Szor |
| 7,383,581 | B1 | 6/2008 | Moore et al. |
| 7,386,889 | B2 | 6/2008 | Shay |
| 7,398,553 | B1 | 7/2008 | Li |
| 7,409,718 | B1 | 8/2008 | Hong et al. |
| 2004/0111632 | A1* | 6/2004 | Halperin ............ 713/200 |
| 2005/0005107 | A1* | 1/2005 | Touboul ............ 713/165 |
| 2007/0220007 | A1* | 9/2007 | Narita et al. ............ 707/9 |
| 2008/0289047 | A1* | 11/2008 | Benea et al. ............ 726/27 |
| 2009/0138967 | A1* | 5/2009 | Faieta et al. ............ 726/22 |

* cited by examiner

*Primary Examiner* — Edan Orgad
*Assistant Examiner* — Roderick Tolentino
(74) *Attorney, Agent, or Firm* — Meyertons, Hood, Kivlin, Kowert & Goetzel, P.C.

(57) ABSTRACT

Various embodiments of a system and method for providing protection against malicious software programs are disclosed. The system and method may be operable to detect that a first window of a legitimate software program has been replaced by a second window of a malicious software program, e.g., where the second window includes features to mimic the first window in an effort to fool the user into inputting sensitive information into the second window. The method may operate to alert the user when the window replacement is detected.

20 Claims, 3 Drawing Sheets

DETECTION OF WINDOW REPLACEMENT BY A MALICIOUS SOFTWARE PROGRAM

BACKGROUND OF THE INVENTION

1. Field of the Invention

This invention relates to computer security. More particularly, the invention relates to a system and method for detecting that a window of a legitimate software program has been replaced by a window of a malicious software program.

2. Description of the Related Art

Users commonly use client software programs such as web browsers to access web sites or other resources on computer networks. When accessing sensitive resources, users are often required to input authentication information, such as a username and password. For example, a user may access a bank account or other financial account by navigating to a web site provided by the user's financial institution and inputting the authentication information. The authentication information is intended to be known only to the user so that unauthorized persons cannot access the user's account.

Unfortunately, users are vulnerable to a wide variety of attacks by malicious programs designed to capture a user's authentication information for malicious purposes. A malicious program may infect a user's computer system, for example, when the user executes a program infected with a virus or performs other actions such as opening an email designed to exploit security vulnerabilities on the user's computer system that allow the malicious program to be unknowingly installed. Once installed, the malicious program may execute on the user's computer system and attempt to capture authentication information or various other types of sensitive information, e.g., in order to transmit the information to a remote computer system where it may be retrieved by another person and used for malicious purposes.

In one type of attack, a malicious program replaces a legitimate web browser program window with a "fake" window of its own. For example, when the user accesses a web page of a particular financial institution to log into a financial account, the malicious program can cause the web browser window to be closed and display in its place another window that looks identical to or very similar to the web page of the financial institution. Unaware that the real web browser window has been replaced, the user may then enter authentication information (or other sensitive information) into input fields in the window displayed by the malicious program, thus enabling the malicious program to capture the information for malicious purposes.

SUMMARY

Various embodiments of a system and method for providing protection against malicious software programs are disclosed. The system and method may be operable to detect that a first window of a legitimate software program has been replaced by a second window of a malicious software program.

According to one embodiment, the method may operate to detect that a first window of a legitimate program is visible on a display device, and to subsequently detect that the first window of the legitimate program becomes hidden from view on the display device at a particular time. For example, the method may be operable to detect various types of events that cause the first window to become hidden from view, such as the first window being closed, the first window being minimized, the first window being moved to a location such that it is not visible, or another window being displayed on top of the first window such that the first window is not visible.

In response to detecting that the first window of the legitimate program becomes hidden from view at the particular time, the method may perform a check to determine whether a second window of another program becomes visible on the display device within a particular (typically small) time interval relative to the particular time at which the first window is hidden. For example, a second window may become visible if the second window is newly created and displayed, or if it was previously located in a hidden location not visible to the user and then moved to a visible location.

If the security program determines that a second window of another program becomes visible within a particular (typically small) time interval relative to the particular time at which the first window becomes hidden, this indicates that the program that displays the second window is potentially a malicious program attempting to replace the first window of the legitimate program.

For example, a malicious program may replace the first window with a second window of its own that looks similar to or identical to the first window, in an effort to fool the user into inputting information into the second window. Thus, the method may operate to determine whether the second window includes one or more particular features of the first window. Detecting that the second window includes the one or more particular features of the first window may indicate that the second window is designed to mimic the first window. Thus, if the method detects that the second window includes the one or more particular features of the first window, the method may operate to alert the user. For example, the method may display information to alert the user that the second window is (or potentially is) a window of a malicious program.

In some embodiments, the legitimate program that displays the first window may be a web browser program, where the first window of the web browser program becomes hidden from view while displaying a web page identified by a particular URL. The particular URL may be displayed in the first window of the web browser program. In this example, if the second window also displays the same URL, this provides an indication that the second window is designed to mimic the first window. Thus, in this example, determining that the second window includes one or more particular features of the first window may include determining that a URL displayed in the second window is the same as a URL displayed in the first window.

BRIEF DESCRIPTION OF THE DRAWINGS

A better understanding of the invention can be obtained when the following detailed description is considered in conjunction with the following drawings, in which.

Figure 1:
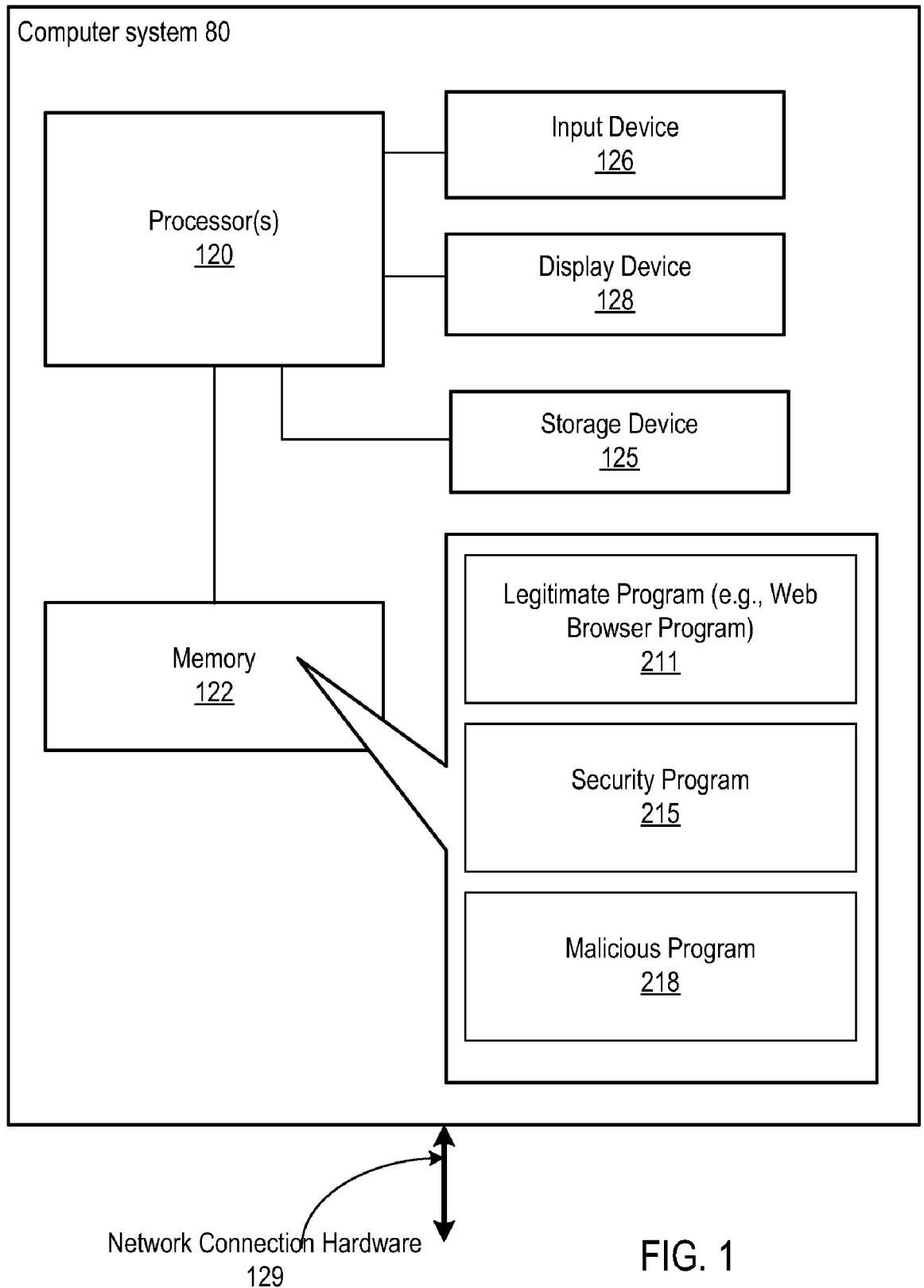
FIG. 1 illustrates an example of a computer system that may execute a security program that implements a method operable to detect that a window of a legitimate software program has been replaced by a window of a malicious software program.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for providing protection against malicious software programs are disclosed herein. The system and method may be operable to detect that a window of a legitimate software program has been replaced by a window of a malicious software program. The method may be implemented on a computer system and may operate to protect a user of the computer system against malicious programs.

FIG. 1 illustrates an example of a computer system 80 in which the method may be used. It is noted that FIG. 1 illustrates one particular embodiment of a computer system, and the method may be used in any of various other types of computer systems.

In this example, the computer system 80 includes a processor 120 coupled to a memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store various programs executable by the processor 120. For example, the memory 122 may store a legitimate software program 211, e.g., a program that is not a malicious program and is known to the user. In various embodiments, the legitimate program 211 may be any type of program with which the user interacts. For example, in some embodiments the legitimate program 211 may be a web browser program. A web browser program is a software program operable to connect to Internet web sites or access resources identified by uniform resource locators (URLs).

The memory 122 may also store a malicious software program 218. As described above, the malicious program 218 may have been surreptitiously installed on the computer system 80 without the user's knowledge. The malicious program 218 may attempt to capture sensitive information by replacing a window of the legitimate program 211 with a window of its own. As one example, where the legitimate software program 211 is a web browser program, the malicious program 218 may monitor the web browser program to determine when the user navigates to a web page of a financial institution and may replace the legitimate web browser window with a window of its own that looks very similar or identical to the web page of the financial institution in an attempt to fool the user into inputting authentication information into the window of the malicious program 218.

In other embodiments, the malicious program 218 may be designed to attack various other types of legitimate software programs other than web browser programs and may attempt to capture any of various other kinds of information from the user. The malicious program 218 may replace the legitimate program window with its own window at various times or under any of various conditions, e.g., depending upon the particular type of legitimate program 211 being attacked and the type of information which the malicious program 218 attempts to capture.

As illustrated in FIG. 1, the memory 122 may also store a security program 215. The processor 120 may execute the security program 215, where the security program 215 implements a method to protect against the above-described attack performed by the malicious program 218. Various embodiments of the method implemented by the security program 215 are described below. The security program 215 may have been installed by the user or by an administrator of the computer system 80 in order to protect against malicious programs.

Referring again to FIG. 1, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the computer system 80 may include multiple processors 120.

The computer system 80 may also include or be coupled to one or more storage devices 125. In various embodiments the storage device(s) 125 may include any of various kinds of storage devices operable to store data, such as optical storage devices, disk drives, tape drives, flash memory devices, etc. As one example, the storage device(s) 125 may be implemented as one or more disk drives configured independently or as a disk storage system.

The computer system 80 may also include one or more input devices 126 for receiving user input from a user of the computer system 80. The input device(s) 126 may include any of various types of input devices, such as keyboards, keypads, microphones, or pointing devices (e.g., a mouse or trackball). The computer system 80 may also include one or more display devices 128 for displaying output to the user. The display device(s) 128 may include any of various types of devices for displaying information, such as LCD screens or monitors, CRT monitors, etc.

The computer system 80 may also include network connection hardware 129 through which the computer system 80 connects to a network. The network connection hardware 129 may include any type of hardware for coupling the computer system 80 to the network, e.g., depending on the type of network. In various embodiments, the network may include any type of network or combination of networks. For example, the network may include any type or combination of local area network (LAN), a wide area network (WAN), wireless networks, an Intranet, the Internet, etc.

In some embodiments the malicious program 218 may be designed to capture information and transmit the information over the network, e.g., in order to transmit the information to a remote computer system where it may be retrieved by another person and used for a malicious purpose. In other embodiments the malicious program 218 may be designed to capture information and store the captured information locally on the computer system 80, e.g., in a file that may be retrieved later by a person who has access to the computer system 80 and wants to use the captured information for a malicious purpose.

Figure 2:
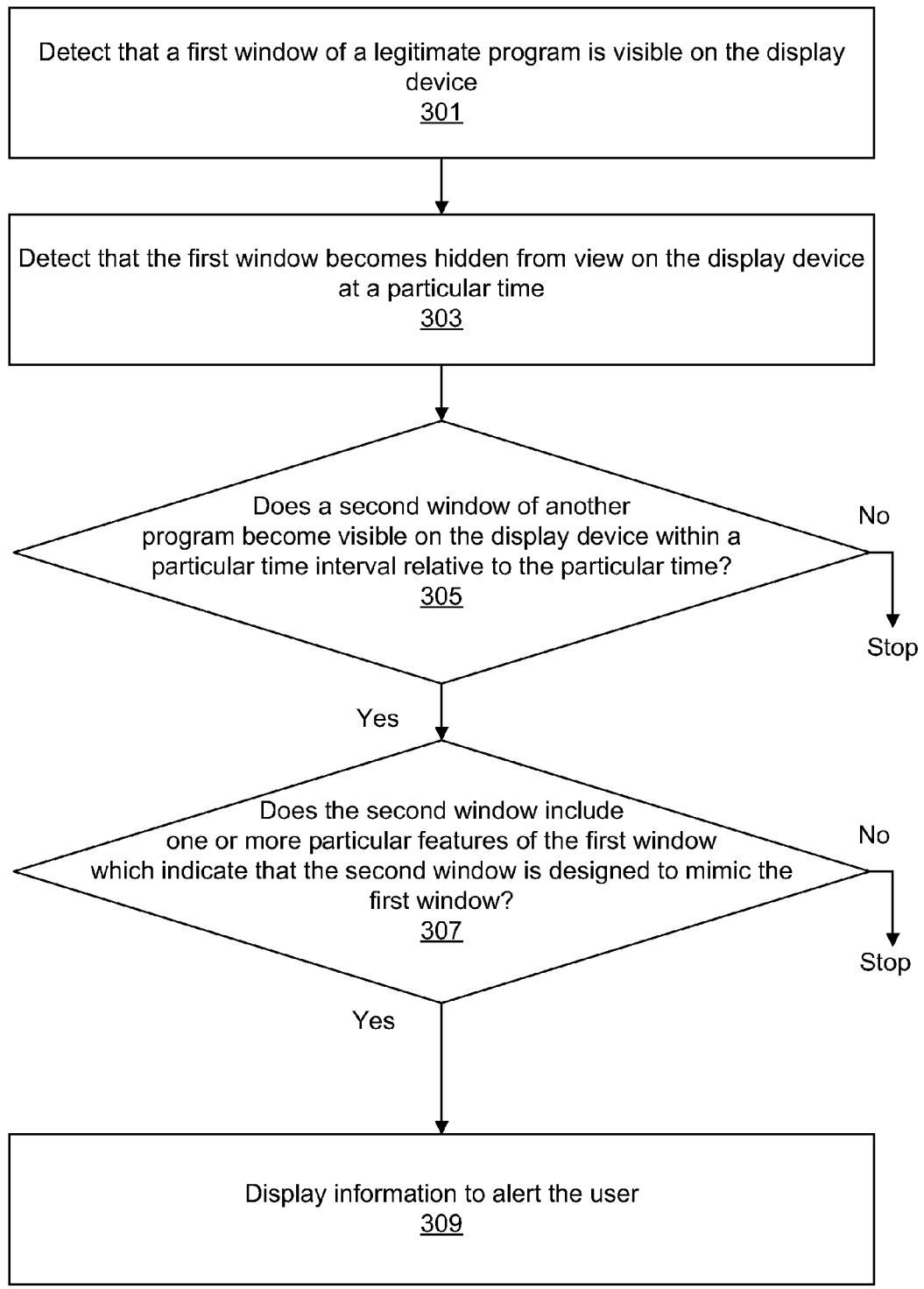
FIG. 2 is a flowchart diagram illustrating one embodiment of the method.

FIG. 2 is a flowchart diagram illustrating one embodiment of a method for detecting that a window of the legitimate software program 211 has been replaced by a window of the malicious software program 218. The method may be implemented by the security program 215.

In 301, the security program 215 may detect that a first window of the legitimate program 211 is visible on the display device. The security program 215 may be operable to monitor the first window of the legitimate program 211, e.g., in order to detect a security attack in which the malicious program 218 causes the first window to be replaced by a second window.

In various embodiments the security program 215 may detect that the first window is visible using any of various techniques, e.g., depending upon the type of the computer system 80, the type of operating system used by the computer system 80, and/or the type of the legitimate program 211. In some embodiments, the security program 215 may communicate with the legitimate program 211 through a programming interface (or may communicate with the operating system or other software programs executing on the computer system 80) so that the security program 215 is automatically notified when the first window is displayed on the display device. In other embodiments, the security program 215 may actively query the operating system of the computer system 80 in order to detect that the first window of the legitimate program 211 is visible on the display device.

In 303, the security program 215 may detect that the first window of the legitimate program 211 becomes hidden from view on the display device at a particular time. For example, the security program 215 may be operable to detect various types of events that cause the first window to become hidden from view, such as the first window being closed, the first window being minimized, the first window being moved to a location such that it is not visible, or another window being displayed on top of the first window such that the first window is not visible.

In various embodiments, the security program 215 may utilize any of various techniques in order to receive notification of or to detect an event that causes the first window to become hidden from view. For example, in some embodiments the security program 215 may utilize a programming interface in order to register to receive notification of events that cause the first window to become hidden from view.

Although the first window is a window of the legitimate program 211, some computer operating systems or windowing environments may allow programs other than the legitimate program 211 to close the first window or otherwise hide the first window from view. In particular, a malicious program executing on the computer system may be operable to cause the first window to be hidden from view. Thus, in response to detecting that the first window was hidden from view, the security software 215 may perform further operations as described below in order to determine whether the first window was caused to be hidden from view by a malicious program (e.g., the malicious program 218) as part of a window replacement attack.

In some embodiments, prior to detecting that the first window of the legitimate program 211 becomes hidden from view, the security program 215 may identify one or more programs or processes executing on the computer system 80 as potentially malicious programs. Any of various techniques may be used to identify potentially malicious programs, e.g., depending upon the type of the legitimate program 211 or its implementation. For example, in some embodiments the legitimate program 211 may be implemented in such a way that the first window can be controlled by calling into a particular program library or module. In some embodiments the security program 215 may query the operating system to determine which programs executing on the computer system 80 have loaded the program library or module that allows the first window to be controlled, or to determine which programs executing on the computer system 80 use this program library or module. The security program 215 may flag each of the programs that load or use this program library or module as a potentially malicious program that could perform a window replacement attack to replace the first window with a malicious window. In some embodiments, however, the security program 215 may know that some programs or processes that have loaded the program library or module can be trusted, and these known programs or processes may not be flagged as potentially malicious programs. For example, known programs or processes of the operating system which load the program library or module may not be flagged as being potentially malicious.

For each program identified as being potentially malicious, the security program 215 may register to receive events generated by the program. Thus, in some embodiments, block 303 may include the security program 215 receiving an event generated by a program previously identified as being potentially malicious, where the event causes the first window to become hidden from view.

In response to detecting that the first window of the legitimate program 211 becomes hidden from view at the particular time, the security program 215 may perform the check illustrated in 305 in order to determine whether a second window of another program becomes visible on the display device within a particular time interval relative to the particular time at which the first window is hidden. For example, a second window may become visible if the second window is newly created and displayed, or if it was previously located in a hidden location not visible to the user and then moved to a visible location.

As described above, a malicious program 218 may attempt to replace the first window of the legitimate program 211 with a window of its own. The window of the malicious program 218 may have the same size and appearance as the first window and may be displayed at the same location on the display device. The time at which the window of the malicious program 218 become visible is typically close in time with respect to the particular time at which the first window is hidden from view, in an effort to prevent the user from noticing that the first window was replaced.

Thus, if the security program 215 determines that a second window of another program becomes visible within a particular time interval relative to the particular time at which the first window becomes hidden, this indicates that the program that displays the second window is potentially a malicious program. In various embodiments the security program 215 may check for a second window being made visible within any desired time interval either before or after the particular time at which the first window becomes hidden. In some embodiments the security program 215 may check for a second window being made visible within a time interval of one second or less, either before or after the particular time at which the first window becomes hidden. However, in other embodiments the security program 215 may check for a second window being made visible more than one second either before or after the particular time at which the first window becomes hidden.

If the security program 215 determines that another window of another program is not made visible within the particular time interval relative to the particular time at which the first window becomes hidden then this indicates that an attack in which a malicious program attempts to replace the first window with a window of its own has not occurred, and the security program 215 may terminate its check for such an attack.

If, however, the security program 215 does determine that a second window is made visible within the particular time interval relative to the particular time in which the first window becomes hidden then the security program 215 may perform a further check as illustrated in 307 in order to determine whether the second window includes one or more particular features of the first window which indicate that the second window is designed to mimic the first window. For example, the check performed in 307 may determine whether one or more particular features of the second window match (e.g., are the same as or very similar to) the one or more particular features of the first window.

For example, as described above, a malicious program may replace the first window with a second window of its own that looks similar to or identical to the first window, in an effort to fool the user into inputting information into the second window. Thus, if the security program 215 determines that the second window does include one or more features which indicate that the second window is designed to mimic the first window then the security program 215 may conclude that the second window is a window of a malicious program or may conclude that there is a high probability that the second window is a window of a malicious program. Thus, the security program 215 may display information on the screen to alert the user. For example, in some embodiments the security program 215 may display information to alert the user that the second window is (or potentially is) a window of a malicious program.

In some embodiments the security program 215 may also perform additional operations to protect the user from the malicious program. For example, in some embodiments the security program 215 may terminate the second window or lock the second window in order to prevent the user from inputting information into the second window. The security program 215 may also provide the user with information indicating which program on the computer system 80 replaced the first window with the second window. In some embodiments the security program 215 may also provide the user an option to request the security program 215 to attempt to automatically delete or quarantine the malicious program, or may flag the malicious program so that it is handled by another security program designed to remove malicious programs from the computer system 80.

The security program 215 may also provide the user with an option to request the security program 215 to ignore the suspicious behavior and/or to flag the program that created the second window as a non-malicious program. Thus, if the security program 215 mistakenly identified the window replacement as a security attack on this occasion then the security program 215 may ignore similar events caused by the same program in the future.

Referring again to 307, in various embodiments the security program 215 may be operable to check whether the second window includes any of various features of the first window, e.g., depending upon the type of the legitimate program 211 and the content or appearance of the first window. As one example, suppose that the legitimate program 211 is a web browser program, where a first window of the web browser program becomes hidden from view while displaying a web page identified by a particular URL. The particular URL may be displayed in the first window of the web browser program, e.g., in an address field. In this example, if the second window also displays the same URL, this provides a strong indication that the second window is designed to mimic the first window. Thus, in this example, determining that the second window includes one or more features of the first window may include determining that a URL displayed in the second window is the same as a URL displayed in the first window.

In other embodiments the security program 215 may be operable to compare various other types of features of the second window to features of the first window. For example, in some embodiments, determining that the second window includes one or more features of the first window may include determining that the second window has graphical features similar in appearance to graphical features of the first window. For example, the first window may include various types of graphical user interface elements for receiving user input from the user, such as text boxes for receiving text input, buttons, checkboxes, etc. If the second window includes similar or identical graphical user interface elements of the same size and displayed in the same relative locations as in the first window, this provides an indication that the second window is designed to mimic the first window.

Thus, in some embodiments the security program 215 may be operable to analyze graphical user interface elements displayed on the first window and the second window and compare them to each other, as well as possibly analyzing and comparing various other types of graphical features, such as text labels, title bars, colors, images, etc. Referring again to the example in which the legitimate program 211 is a web browser program, in some embodiments the security program 215 may be operable to determine whether the second window displays HTML code or other markup language code that results in the second window displaying similar GUI input elements as the first window or otherwise having a similar or identical appearance as the first window.

As another example, the security program 215 may be operable to compare the size and location of the second window to the size and location of the first window. If the two windows have the same size and location, this may provide an indication that the second window is designed to mimic the first window.

Figure 3:
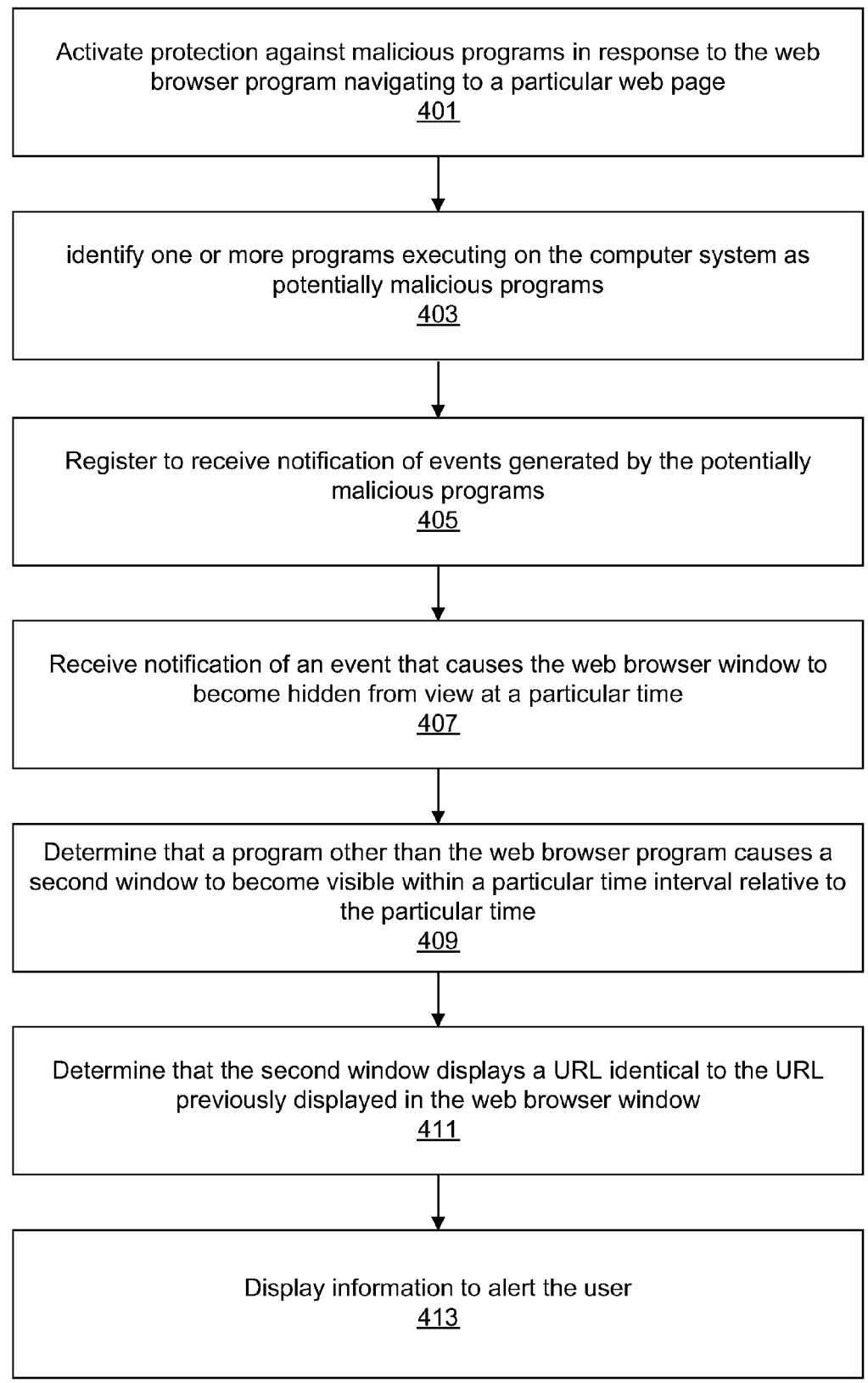
FIG. 3 is a flowchart diagram illustrating a particular embodiment of the method, in which the legitimate software program is a web browser program.

Referring now to FIG. 3, a flowchart diagram illustrating a particular embodiment of the method described above is illustrated. In this example the legitimate program 211 is a web browser program, and the malicious program 218 attempts to replace a first window of the web browser program with a second window of its own without the user's knowledge.

In some embodiments, it may be desirable for the security program 215 to monitor for the above-described types of window replacement attacks by malicious programs only when the user of the web browser program visits certain sensitive web sites or web pages. For example, it may be desirable for the security program 215 to monitor for such attacks when the user navigates to a web page of a financial institution or other web page where the user may enter sensitive information.

Thus, as indicated in 401, the security program 215 may determine when the user has navigated to a particular web site or web page, and in response, may activate protection against malicious programs, e.g., where activating the protection causes the security program 215 to begin monitoring for replacement of the web browser window by potentially malicious programs, as described above.

As indicated in 403, the security program 215 also identifies one or more programs executing on the computer system as being potentially malicious programs, as described above. For example, in some embodiments the legitimate program 211 may be a Microsoft Internet Explorer™ web browser program executing on a computer system 80 running a Microsoft Windows™ operating system. The security program 215 may determine which programs or processes executing on the computer system 80 have loaded the "shdocvw.dll". This dynamic link library (DLL) enables a program to control an Internet Explorer™ web browser window. Thus, each of the programs that has this DLL loaded may be identified as a potentially malicious program, and the security program 215 may register to receive events generated by these programs, as indicated in 405. (As described above, in some embodiments, known operating system processes may be trusted so that they are not considered to be potentially malicious programs.)

As indicated in 407, the security program 215 may subsequently receive notification of an event that causes the web browser window to become hidden from view at a particular time. For example, one of the programs identified as being potentially malicious may generate an event that causes the web browser window to be closed, minimized, or moved to a hidden location.

In response to receiving notification of the event, the security program 215 may perform a check to determine that a program other than the web browser program causes a second window to become visible within a particular time interval relative to the particular time, as indicated in 409. In some embodiments, the security program 215 may check for a second window of any program (other than the web browser program) becoming visible within the particular time interval relative to the particular time. In other embodiments, the security program 215 may only check for a second window created by one of the programs previously identified as being potentially malicious.

In response to detecting the second window, the security program 215 may attempt to determine whether the second window displays a URL. For example, the security program 215 may call an application programming interface or may analyze window information for the second window in order to determine a URL displayed in the second window. If the security program 215 is able to retrieve a URL from the second window then the security program 215 may compare this URL to the URL previously displayed in the web browser window. In this example, the security program 215 determines that the two URLs are identical, as indicated in 411.

Since the first window of the web browser program was replaced closely in time by a second window of another program, and since the second window displays the same URL as the first window, this provides a strong indication of an attack by a malicious program attempting to fool the user into inputting sensitive information into the second window. Thus, the security program 215 may display information to alert the user that the second window is a window of a malicious program, similarly as described above.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., disk (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable to:
   detect that a first window of a first program is visible on a display device;
   detect that the first window becomes hidden from view on the display device at a first time;
   detect that a second window of a second program becomes visible on the display device at a second time
   calculate whether the second time at which the second window became visible is within a particular time interval relative to the first time at which the first window became hidden from view; and
   display information to alert a user in response to both calculating that the second time is within the particular time interval relative to the first time and detecting that the second window includes one or more features of the first window.

2. The non-transitory computer-accessible storage medium of claim 1,
   wherein displaying the information alerts the user that the second window is a window of a malicious program.

3. The non-transitory computer-accessible storage medium of claim 1,
   wherein the program instructions are executable to detect that the first window becomes hidden from view by receiving notification of an event causing the first window to become hidden from view.

4. The non-transitory computer-accessible storage medium of claim 3,
   wherein the notification indicates that a program other than the first program caused the first window to become hidden from view.

5. The non-transitory computer-accessible storage medium of claim 1,
   wherein the program instructions are executable by a computer system to:
      prior to detecting that the first window becomes hidden from view, identify one or more programs executing on the computer system as potentially malicious programs; and
      register to receive notification of events generated by the one or more programs identified as potentially malicious programs;
   wherein the program instructions are executable to detect that the first window becomes hidden from view by receiving notification of a first event generated by a first program identified as a potentially malicious program, wherein the first event indicates that the first window becomes hidden from view.

6. The non-transitory computer-accessible storage medium of claim 1,
   wherein the program instructions are executable by a computer system to:
      identify one or more programs executing on the computer system as potentially malicious programs; and
      in response to detecting that the first window becomes hidden from view, check whether any of the potentially malicious programs cause a window to become visible on the display device within the particular time interval relative to the first time;
   wherein said checking detects that the second window of the second program becomes visible on the display device within the particular time interval relative to the first time.

7. The non-transitory computer-accessible storage medium of claim 1,
wherein the program instructions are executable to detect that the first window becomes hidden from view by performing one or more of:
detecting that the first window is closed;
detecting that the first window is minimized;
detecting that the first window is moved to a location such that the first window is not visible;
detecting that another window is displayed on top of the first window such that the first window is not visible.

8. The non-transitory computer-accessible storage medium of claim 1,
wherein the first window is a window of a web browser program;
wherein the program instructions are executable to detect that the second window includes one or more features of the first window by detecting that a URL (uniform resource locator) displayed in the second window is the same as a URL displayed in the first window.

9. The non-transitory computer-accessible storage medium of claim 1,
wherein the first window is a window of a web browser program;
wherein the program instructions are further executable to activate protection against malicious programs in response to the web browser program navigating to a particular web site;
wherein the program instructions are executable to perform said detecting that the first window becomes hidden from view, said detecting that the second window becomes visible, said detecting that the second window includes the one or more particular features of the first window, and said displaying the information to alert the user, in response to said activating the protection against malicious programs.

10. The non-transitory computer-accessible storage medium of claim 1,
wherein the program instructions are executable to detect that the second window includes one or more features of the first window by detecting that the second window has one or more graphical features similar in appearance to one or more graphical features of the first window.

11. The non-transitory computer-accessible storage medium of claim 1,
wherein detecting that the second window includes one or more features of the first window comprises detecting that the second window has a same size and location as the first window.

12. A system comprising:
one or more processors; and
memory storing program instructions;
wherein the program instructions are executable by the one or more processors to:
detect that a first window of a first program is visible on a display device;
detect that the first window becomes hidden from view on the display device at a first time;
detect that a second window of a second program becomes visible on the display device at a second time
calculate whether the second time at which the second window became visible is within a particular time interval relative to the first time at which the first window became hidden from view; and
display information to alert a user in response to both calculating that the second time is within the particular time interval relative to the first time and detecting that the second window includes one or more particular features of the first window.

13. The system of claim 12, wherein the program instructions are further executable by the one or more processors to:
prior to detecting that the first window becomes hidden from view, identify one or more programs executing on the computer system as potentially malicious programs; and
register to receive notification of events generated by the one or more programs identified as potentially malicious programs;
wherein the program instructions are executable by the one or more processors to detect that the first window becomes hidden from view by receiving notification of a first event generated by a first program identified as a potentially malicious program, wherein the first event indicates that the first window becomes hidden from view.

14. The system of claim 12,
wherein the first window is a window of a web browser program;
wherein the program instructions are executable by the one or more processors to detect that the second window includes one or more features of the first window by detecting that a URL (uniform resource locator) displayed in the second window is the same as a URL displayed in the first window.

15. The system of claim 12,
wherein the first window is a window of a web browser program;
wherein the program instructions are further executable by the one or more processors to activate protection against malicious programs in response to the web browser program navigating to a particular web site;
wherein the program instructions are executable by the one or more processors to perform said detecting that the first window becomes hidden from view, said detecting that the second window becomes visible, said detecting that the second window includes the one or more particular features of the first window, and said displaying the information to alert the user, in response to said activating the protection against malicious programs.

16. The system of claim 12,
wherein the program instructions are executable by the one or more processors to detect that the second window includes one or more features of the first window by detecting that the second window has one or more graphical features similar in appearance to one or more graphical features of the first window.

17. A method comprising:
a computer system detecting that a first window of a first program is visible on a display device;
the computer system detecting that the first window becomes hidden from view on the display device at a first time;
the computer system detecting that a second window of a second program becomes visible on the display device at a second time;
the computer system calculating whether the second time at which the second window became visible is within a particular time interval relative to the first time at which the first window became hidden from view; and
the computer system displaying information to alert a user in response to both calculating that the second time is within the particular time interval relative to the first time and detecting that the second window includes one or more particular features of the first window.

18. The method of claim 17,
wherein displaying the information alerts the user that the second window is a window of a malicious program.

19. The method of claim 17, further comprising:
prior to detecting that the first window becomes hidden from view, the computer system identifying one or more programs executing on the computer system as potentially malicious programs; and
the computer system registering to receive notification of events generated by the one or more programs identified as potentially malicious programs;
wherein said detecting that the first window becomes hidden from view comprises receiving notification of a first event generated by a first program identified as a potentially malicious program, wherein the first event indicates that the first window becomes hidden from view.

20. The method of claim 17,
wherein the first window is a window of a web browser program;
wherein detecting that the second window includes one or more features of the first window comprises detecting that a URL (uniform resource locator) displayed in the second window is the same as a URL displayed in the first window.

* * * * *